UNITED STATES PATENT OFFICE.

BAPTISTIN MARCET, OF MARSEILLE, FRANCE, ASSIGNOR TO RENÉ OLIVER, OF MARSEILLE, FRANCE.

PROCESS OF PRESERVING FRUIT.

1,087,798. Specification of Letters Patent. Patented Feb. 17, 1914.

No Drawing. Application filed March 19, 1913. Serial No. 755,331.

*To all whom it may concern:*

Be it known that I, BAPTISTIN MARCET, a citizen of France, and residing at Marseille, in the Republic of France, have invented certain new and useful Improvements in Processes of Preserving Fruits in Their Natural Condition, of which the following is a specification.

The invention relates to improvements in processes of preserving fruits in their natural state, and more particularly to the treatment of such fruits for use in confectionery.

The object in view is the effective preservation of fruit in its natural state for relatively long periods, and in accomplishing this object the invention is carried out by immersing fresh fruit in a solution of bisulfite of soda and sulfurous anhydrid.

In carrying out the invention in detail fresh fruit, preferably of selected quality, is introduced into a barrel or other container supplied with an appropriate quantity of water, as for instance twenty-seven gallons. As much fruit is introduced into the liquid as can be submerged therein, and about two pounds of bisulfite of soda crystals are deposited in the water, together with about six pounds of common salt (NaCl). A small quantity of lime sulfite may also be added, for instance, a teaspoonful, especially if the fruit being treated is of the nature of apricots and yellow peaches. The fruit is then removed from the solution and placed in a receptacle containing approximately two hundred and seventy gallons of water in which has been mixed from two to six pounds of sulfurous anhydrid. Obviously instead of removing the fruit from the first receptacle the liquid may be removed therefrom and the second liquid introduced thereinto. After the subjection of the fruit to the action of the second liquid the fruit is placed in plain water and subsequently removed therefrom.

Instead of making two separate operations out of the sulfuring of the fruit, the solutions of bisulfite of soda and sulfurous anhydrid may be placed together in a receptacle and the fruit subjected to the action thereof in a single operation.

Having thus described the invention what is claimed as new is:

1. The process of preserving fruit comprising immersing fruit in a solution of bisulfite of soda, sulfurous anhydrid and common salt.

2. The process of preserving fruit comprising immersing fruit in a solution of bisulfite of soda, common salt and lime sulfite.

3. The process of preserving fruit comprising immersing fruit in a solution of bisulfite of soda, sulfurous anhydrid, common salt, and lime sulfite.

4. The process of preserving fruit comprising immersing fresh fruit in a solution of substantially twenty-seven gallons of water in which is dissolved two pounds of bisulfite of soda crystals, six pounds of common salt, and a teaspoonful of lime sulfite.

In testimony whereof I have signed my name to this specification, in the presence of two subscribing witnesses.

BAPTISTIN MARCET.

Witnesses:
 MAURICE MUVRY,
 PAUL DE GAU.